United States Patent
Chen

[11] Patent Number: 5,868,597
[45] Date of Patent: Feb. 9, 1999

[54] ULTRA-SOFT, ULTRA-ELASTIC GEL AIRFOILS

[75] Inventor: John Youngfu Chen, Pacifica, Calif.

[73] Assignee: Applied Elastomerics, Inc., South San Francisco, Calif.

[21] Appl. No.: 256,235

[22] PCT Filed: Jun. 27, 1994

[86] PCT No.: PCT/US94/07314

§ 371 Date: Jun. 27, 1994

§ 102(e) Date: Jun. 27, 1994

[87] PCT Pub. No.: WO96/00118

PCT Pub. Date: Jan. 4, 1996

Related U.S. Application Data

[63] Continuation-in-part of PCT/US94/04278 Apr. 19, 1994, continuation-in-part of Ser. No. 152,734, Nov. 15, 1993, Pat. No. 5,624,294, and a continuation-in-part of Ser. No. 114,688, Aug. 30, 1993, Pat. No. 5,475,890, and a continuation-in-part of Ser. No. 935,540, Aug. 24, 1992, Pat. No. 5,336,708, and a continuation-in-part of Ser. No. 876,118, Apr. 29, 1992, Pat. No. 5,324,222, and a continuation-in-part of Ser. No. 705,096, May 23, 1991, Pat. No. 5,655,947, which is a continuation-in-part of Ser. No. 527,085, May 21, 1990, abandoned.

[51] Int. Cl.[6] .................................................. A63H 27/00
[52] U.S. Cl. .............................................. 446/46; 446/486
[58] Field of Search .................................. 446/46, 48, 486

[56] References Cited

U.S. PATENT DOCUMENTS

| | | | |
|---|---|---|---|
| 4,255,893 | 3/1981 | Anderson et al. | 446/48 |
| 4,737,128 | 4/1988 | Moormann et al. | 446/46 |
| 4,846,757 | 7/1989 | McMurray | 446/486 |
| 5,655,947 | 8/1997 | Chen | 446/46 |

*Primary Examiner*—Robert A. Hafer
*Assistant Examiner*—Jeffrey D. Carlson

[57] ABSTRACT

A novel rotating aerodynamic toy made of a ultra-elastic gel airfoil which is suitable for launch in light or heavy wind conditions and capable of performing various aerodynamic effects including climb, stall, return, straight-line flight and other aerobatics. The ultra-elastic properties of the airfoil allow the airfoil to transform by at least 50% extension of its aerodynamic profile at launch and; while in flight; one or more preselected sized cavities and holes, slots and holes, cavities, slots and holes and cavities, slots, or holes provide handling, elastic control of airfoil profile stretching for flight, and flight stability.

15 Claims, 9 Drawing Sheets

ULTRA-SOFT, ULTRA-ELASTIC GEL AIRFOILS

BACKGROUND OF THE INVENTION

1. Origins of Invention and Related Applications

This application is a continuation-in-part application of applications Ser. No. PCT/US94/04278, filed 19 Apr., 1994; Ser. No. 152,734, filed Nov. 15, 1993 now U.S. Pat. No. 5,624,294; Ser. No. 114,688, filed Aug. 30, 1993 now U.S. Pat. No. 5,475,890; Ser. No. 935,540 filed Aug. 24, 1992 now U.S. Pat. No. 5,336,708; Ser. No. 876,118 filed Apr. 29, 1992 now U.S. Pat. No. 5,324,222; Ser. No. 705,096 filed May 23, 1991 now U.S. Pat. No. 5,655,947 which are continuation-in-part applications of Ser. No. 527,085 filed May 21, 1990 now abandoned. The subject matter contained in the related applications and patents are specifically incorporated herein by reference.

2. Technical Field of Invention

The present invention relates to aerodynamic toys.

3. Background of Art

The closest known art are include below.

UK patent 1,268,431 discloses a symmetric gel ball.

U.S. Pat. No. 5,026,054 discloses a highly plasticized polymeric symmetric shaped annular core enclosed in a flexible polymer shell and further encased in a stretchable fabric cuter cover.

U.S. Pat. Nos. 4,369,284 and 4,618,213 discloses gel compositions and gel articles including gel optical lens.

U.S. Pat. No. 4,737,128 discloses a (concave top shape and convex bottom shape) airfoil resilient enough so that when resting on a horizontal surface, its outer annular edge will be able to support the entire airfoil without the airfoil's interior portion touching the horizontal surface on which it rests.

A gel ring for looping over the thumb and pulled back on the other end can be shot like a rubber band and routinely achieve shots of 25 to 30 feet is available from Applied Elastomerics, Inc., of Pacifica, Calif. under the tradename "SMARTRING".

Disclosure of Invention

2. Statement of Invention

SUMMARY OF THE INVENTION

I have unexpectedly discovered novel aerodynamic toys comprising a camber defined by a profile in the shape of an airfoil made from an ultra-soft, ultra-elastic gel; said airfoil having one or more preselected holes forming a communicating surface between a upper surface and a lower surface, optionally, said airfoil having one or more preselected holes and cavities, one or more preselected holes and slots, one or more preselected cavities and slots, or one or more preselected cavities, or slots; said airfoil is made from a gel including a gel comprising a high viscosity poly(styrene-ethylene-butylene-styrene), optionally, in combination with one or more homopolymers or copolymers.

The ability of the gel airfoils to perform various aerodynamic effects including sustained flight under varying wind conditions without turn over is totally unexpected.

The various aspects and advantages of the invention will become apparent to those skilled in the art upon consideration of the accompanying disclosure and the drawings.

2a. FIGURES

Modes for Carrying Out the Invention

The airfoils of the present invention are not limited to any particular aerodynamic profile (see FIGS. 1–10), although certain profiles may have advantages over others such as for speed, distance, climb, stall, return, etc. The basic principles of aerodynamic and airfoil design can be utilized to assist in selecting and forming the profiles of the ultra-soft, ultra-elastic gel airfoils of the invention. In designing the airfoils of the invention, Bernoulli's principle should be kept in mind, in simple words: in a nonviscous flow a deceleration is accompanied by a rise in pressure along the streamline; conversely, in an acceleration, there must be a fall in pressure along the streamline. More simply, the conditions are: along a particular streamline: (1) where the air speed is high, the air pressure is low; and (2) where the air speed is low, the air pressure is high.

Examples of references useful in the design of shaped airfoils of the invention include: *Shape and Flow,* by A. H. Shapiro, 1961, Doubleday & Company, Inc.; *Aerodynamics of Wings and Bodies,* by H. Ashley, at al, 1965, Dover Publications, Inc.; *Theory of Flight,* by R. Von Mises, 1959, Dover Publications, Inc.; *Aerodynamics Theory,* W. F. Durand, Editor, Volume I–VI, 1963, Peter Smith Publisher, Inc.; *Rotary-Wing Aerodynamics,* W. Z. Stepniewski, et al, Volume I & II, 1984, Dover Publications, Inc.; *Incompressible Aerodynamics,* B. Thwaites, Editor, 1960, Oxford Press; *Modern Developments in Fluid Dynamics,* S. Goldstein, Editor, Volume I & II, 1950, Oxford Press; *Hydrodynamics,* by Sir H. Lamb, 1945, Dover Publications, Inc.; *Fluid-Dynamic Lift,* by S. F. Hoerner, 1975, Published by Mrs. Liselotte A. Hoerner; and *Fluid-Dynamic Drag,* by S. F. Hoerner, 1958, Published by the Author; *Foundations of Aerodynamics,* by Kuethe, Arnold M., et al, 3rd Edition, John Wiley & Sons, 1976. The subject matter contained in these publications are specifically incorporated herein by reference.

Generally, any aerodynamic profile can be selected for use in the design of the airfoil of the invention provided the profile selected gives the airfoil (when launched by hand) a sustained flight-time in air that is greater than the time required for the airfoil to fall the vertical distance to the ground in free-fall when released from the same launch height.

Figure 1A:
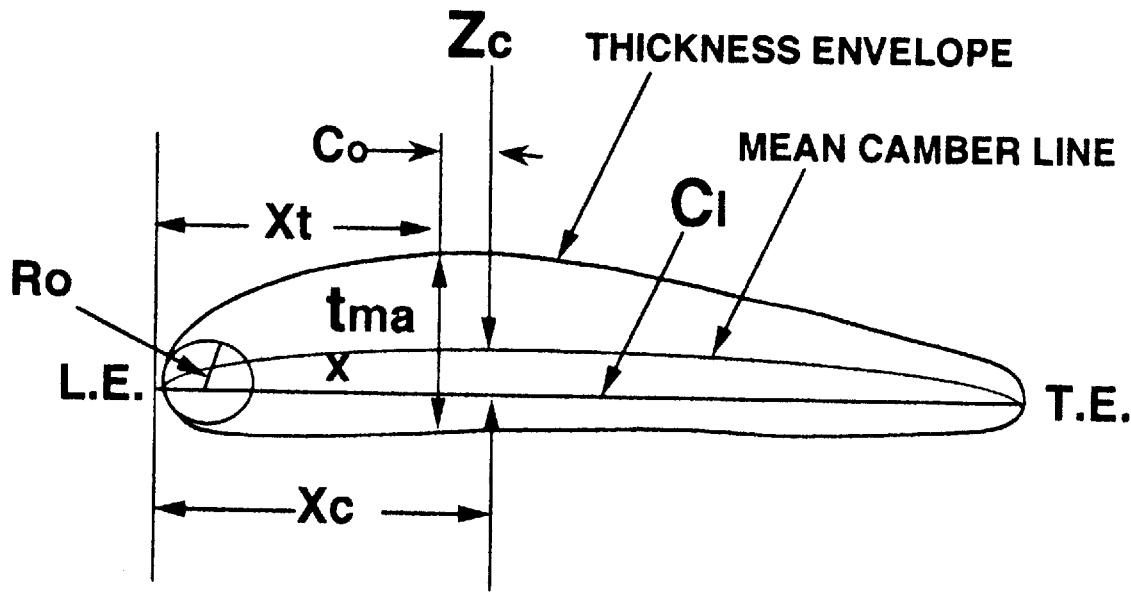
FIG. 1a. Representative static view of a spinning airfoil (at an elongation of at least 200%) showing various geometrical variables.
Figure 1B:
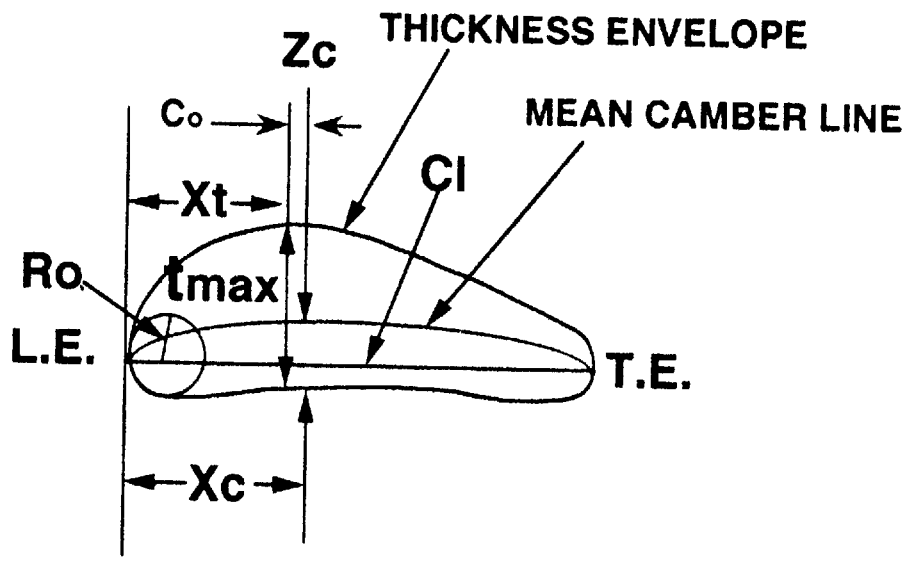
FIG. 1b. Representative normal view of the airfoil of FIG. 1a (at zero elongation) showing various geometrical variables.

The airfoils of the invention comprises a thickness envelope wrapped around a mean camber line as shown in FIG. 1. The 1989, 7th Edition of van Nostrand's Scientific Encyclopedia defines camber as follows: "The carved line from the leading edge to the trailing edge of the airfoil is known as the camber. The curvature of the upper and lower surfaces, as well as a median line between them, is often referred to as camber or camber line." Profiles for the airfoil of the invention can be selected with mean camber lines shown in FIG. 2 or any intermediate mean camber line. The mean camber line lies halfway between the upper and lower surfaces of the airfoil and intersects the chord line at the leading and trailing edges. An intermediate mean camber line can be obtained from any two adjacent mean camber lines shown in FIG. 2 by drawing a new intermediate mean camber line halfway between the adjacent mean camber lines. Likewise an intermediate mean camber line can be used together with another mean camber line or another intermediate mean camber line to derive a new intermediate mean camber line. A family of useful camber lines can be created by this method. The thickness envelope (bounded by an upper surface and a lower surface) of the airfoils of the invention can be of any suitable thickness provided the resulting airfoil is capable of sustained flight. Other geometrical variables of airfoils' of the invention are shown in FIG. 1; they include the cord line $C_L$; the maximum camber $Z_c$ of the mean camber line and its distance $X_c$ behind the leading edge; the maximum thickness $t_{max}$ and its distance $x_t$ behind the leading edge; the radius of curvature of the surface at the leading edge, $R_o$, and the angle between the upper and lower surfaces at the trailing edge. In the design of the airfoils of the invention, the geometrical variables should be selected so as to provide the instant airfoils with the ability for sustained flight in low as well as high wind conditions.

A suitable range for $C_L$ is less than about 3 cm to about 30 cm or more, typically 5 cm to 20 cm. The value ($X_c$–$X_t$)=$C_o$ can range from less than about 2 cm to greater than about 20 cm, typically 5 cm to 15 cm. The variable $t_{max}$ can range from less than about 1 cm to greater than about 7 cm, typically 3 cm to 5 cm.

The aerodynamic profile (i.e. cross-sectional geometry) of the airfoils of the invention can be varied as desired. A helpful way of designing and/or viewing the airfoils' profile from the side is to vertically cut the airfoils into adjacent slices. For example, the adjacent slices can be a series of different cross sections (i.e. cross sections of different geometrical variable values). A way to simulate the flight airfoil profile from the non-spinning static one is by elongating the airfoil profile approximate the elongation sustained in flight. Another method is to spin the airfoil as discussed below.

The three dimensional airfoils can be sliced to show more than one cross sections. For example, viewing down on the upper surface, airfoils of the invention can have shapes such as a ring, circle, square, triangle, parallelogram, rhombus, trapezoid, quadrilateral, pentagon, hexagon, heptagon, octagon, nonagon, decagon, undecagon, dodecagon, polygon, sector, a circle, an ellipse, a parabola and the like. The general solid shapes of the instant airfoils can be general prismatoids, such as, a sphere, a hemisphere, spherical triangle, spherical segment or sector, curved volume of a right cylinder, curved volume of a right cone, oblate spheroid, oblate hemispheroid, semi-hemispheroid, quaihemispheroid, prolate spheroid, prolate hemispheroid, frustum of right circular cone, solid lune, ellipsoid, and the like. Other unusual solid shapes can include an egg shape, a hemi-egg shape, a papaya shape, a hemi-papaya shape, a pear shape, a hemi-pear shape or almost any spheroidal shape. Still other shapes can include football or hemi-American-football shape.

Although solid general prismatoid shapes such as spheroid shapes perform poorly in flight, most (such as a solid sphere) will not develop the required lift for sustained flight at any degree of spin. Lift can be imparted, however, to the solid general prismatoid shapes by modifying the solid shapes with an internal or external gel component having one or more substantially different gel rigidity regions to so as to make the solid airfoil shapes non-symmetric. See FIG. 6 for examples of various profiles. The additional requirements for forming general prismatoids with one or more internal and/or external regions are: (1) the resulting gel airfoils must have a sufficient volume of low gel rigidity region or regions for the bodies to exhibit a base diameter, D, (this is a measurable diameter advantageously of at least about 20% to 200% or more of the bodies' axes diameter and (2) a sufficient volume of high gel rigidity region or regions to allow a preselected volume of the bodies to support its own shape (i.e. moulded high gel rigidity shaped region) and exhibit a advantageously preselected amount of altitude, H, with a measurable height of about 20% or less to about 70% or more of the bodies' largest axes diameter (see FIGS. 9*a* and 9*b*). In order for the general prismatoids to have a base, the rigidity of the low gel rigidity region(s) should be at least about 50 gram Bloom or lower. A body formed in accordance with conditions (1) and (2) will exhibit a base when placed on a flat leveled surface of a preselected diameter. This base is defined as the surface area of contact of the body shape with the flat surface. For example, if a 6.5 cm diameter solid body shape is made from a uniformly high rigidity gel of say 80 gram Bloom or higher, the body will exhibit a base diameter of less than about 20% (less than about 1.3 cm) when place on a flat surface. Likewise, if a 6.5 cm diameter solid body shape is made from a uniformly low rigidity gel of say 20 gram Bloom or lower, the body will exhibit a base diameter greater than about 20% (greater than about 1.3 cm) when place on a flat surface. In both cases, the resulting low and high "uniform" gel solid body shapes will not have sufficient lift. If, however, one half of each of the low and high rigidity gel shapes are combined together, the resulting (non-uniform) solid body shape will exhibit a base diameter, D, greater than 20% of its axes diameter (due to the low rigidity half region) and an altitude, H, of about 50% of its axes diameter or about 3.25 cm (due to the high rigidity half region). Such a non-uniform, unstremelined "blunt" shaped solid body will exhibit lift.

Various ways of making airfoils, such as forming a relatively low gel rigidity inner gel regions followed by a high gel rigidity outer (regions), are possible, as is the use of triple-layers (regions), etc. For example, the inner core of a general prismatoid shaped body can be made of urethane gel, the middle layer of silicone gel, and the outer layer of (SEBS) gel with varying rigidity regions.

The upper surface of airfoils of the invention can be smooth, patterned, rough, and the like. The airfoils, its upper surface and parts may contain one or more cavities, slots or holes completely through the airfoil (see FIGS. 3, 4, 6, 7, and 8) and its parts can also be connected by thin membranes. The advantages of having one or more preselected sized holes cavities and slots is to improve handling, launching, and flight characteristics of the gel airfoils of the invention.

Over many thousands of launches of hundreds of different gel airfoil profiles under varying wind conditions, cavities, slots, holes, and membranes are observed to be of great advantage in their affects on flight characteristics of the gel airfoils of the invention. Cavities provide added advantage of holding and launching the airfoil by hand as well as allowing for a greater lower surface expansion surface area for the airfoil to transform into a streamline shape; their presence also reduce stress and tearing of the lower surface during launching (see FIGS. 3, 4, 6, 7, 8, and 10). Slots on the surfaces of the airfoil provide added advantage of delaying boundary-layer separation, reducing drag and providing greater lift (see FIGS. 4 and 7). Holes of preselected sizes provide airfoil stability during flight and prevent turn over (see FIGS. 3, 4, 6, 7, and 8). Membranes shows great advantage for use in connecting parts of the airfoil and control stretching of the connected parts during flight (see FIG. 8). It is found that without cavities, the lower surface will tear or show stress marks much sooner than without. The airfoils will attain greater level distance flight with cavities than without. It is found that slots on the airfoil upper surface will prevent early onset of stall and reduce drag. It is observed that holes of preselected size will provide level and stable flight. It is observed that a selected thickness membrane in combination with one or more holes is of advantage to provide essential control of airfoil profile stretching and stable, level flight without turn over.

It is advantage for the hole diameter in the airfoil membrane to be about 0.2 cm to about 1.5 cm, more typically about 0.1 cm to about 1 cm, and especially about 0.1 cm to about 0.5 cm. Where it is desirable to have the smallest holes in the membrane, multiple holes can be distributed over the entire surface of the membrane.

In the case of gel airfoils of FIGS. 3, 4, 6, 7, and 10, it is of great advantage to form holes, cavities, and slots. The advantage size of the holes is about 0.2 cm to about 1.5 cm diameter, typically from about 0.2 cm to about 1.0 cm, more typically from about 0.2 cm to about 0.8 cm. The ratio of the airfoil base diameter (mean camber line length) to the hole diameter should be at least about 5 and greater. For example, if an airfoil's mean camber line is 7.5 cm, then any of the hole diameter should be no greater than about 1.5 cm.

Cavity diameter size which are advantage in forming the airfoils of the invention is about 1 cm to about 3 cm, typically about 1 cm to 2.5 cm, more typically from about 1 cm to 2 cm.

The slot size which is of advantage is about 0.1 cm to about 0.5 cm, typically from about 0.1 cm to 0.3 cm, and more typically from about 0.1 cm to about 0.2 cm.

The lower surface can be curved to any desired degree (centered or off-centered), or it can contain one or more cavities (centered or off-centered) of any desired shape (see FIGS. 3, 4, 6, 7, and 10).

The airfoils of the invention can be launched by hand. Launching aids can also be used to grip the trailing edge of the airfoils such as a "VI" shaped device to simulate the fingers and thumb. Normally, an airfoil of the invention is launched with a spin of the wrist. The spinning wrist action imparts rotation to the airfoil so as to elongate the airfoil as it leaves the hand. The elongated airfoil will continue to spin and maintain its flight path while at the same time reach a maximum elongation due to centrifugal force and then retract back to its original shape as the spin reach a maximum and slows to a stop. Elongations of the airfoils (as measured from leading edge to trailing edge) under flight conditions can reach 50% or more. Elongations of 100%, 200%, 300%, 400%, 500%, 600%, 700% and higher are possible under flight conditions. Airfoils-of the invention can be designed to withstand elongations higher than 1,000% which can occur at extreme high spin speeds.

Airfoils of the invention can fly at rotational speeds, $R_S$, of less than about 10 rpm to greater than about 1,500 rpm, typically 200 rpm to 1,000 rpm. The instant airfoils can be launched at speeds, $S_1$, less than about 5 mph to about 80 mph and higher, typically 15 mph to about 50 mph. Airfoils were tested in the laboratory and in the field using a few simple equipment. Airfoils were mounted on a variable spinning device. The rotational speeds were measured by using a GenRad 1546 digital stroboscope. Both natural and laboratory winds were measured using a Hall Airspeed Indicator. Laboratory winds (up to 55 mph) were generated using a Rotron Inc. Centrimax model CXH33 Blower and wind tunnel assembly. Airfoil characteristics such as: angle of attack, geometrical profile, climb, drag, lift, Reynolds number, stall, rotational velocity, aspect ratio, stall, twist, pitch, sides angle, cord length, yaw angle, deformations, vibrations, air circulation and the like can be observed, measured and/or calculated under a variety of flight conditions.

Two Reynolds Numbers can be used to characterize the airfoils of the invention. These are: $R_{e1}$ and $R_{e2}$.

$$R_{e1} = \{[S_f - R_s(C_L/2)]C_o\}/V_{u,r}$$

and $$R_{e2} = \{[S_f + R_s(C_L/2)]C_o\}/V_{u,r}$$

where $V_{u,r}$=Viscosity/Density or approximate=0.15 cm$^2$/second in air. $R_{e1}$ and d $R_{e2}$ can range from less than about 200 to about 100,000 or more. More suitably, $R_{e1}$, and $R_{e2}$ can range from less than about 5000 to about 50,000 and higher.

The instant airfoils can fly under almost any wind condition, almost no wind (0.01 m.p.h.), low wind (0.5 m.p.h.), light wind (0.6 m.p.h.), moderate light wind (15 m.p.h.), moderate wind (25 m.p.h.), high wind (35 m.p.h.) and even under wind gust conditions greater than 40 m.p.h.

The instant airfoils can be made from any gel material with suitable elastic properties. These include: (1) Memorygel®, (2) various polymer gels; (3) crosslinked polymer gels; other less suitable gels include high strength: (4) silicone gel; (5) urethane gels; (6) water based gels; triblock copolymer gels especially suitable for use: (7) SEBS gels; examples include: (a) Kraton G 1651, G 1654X gels; (b) Kraton G 4600 gels; (c) Kraton G 4609 gels; other less suitable SEBS oil gels: examples include: (d) Tuftec H 1051 gels; (e) Tuftec H 1041 gels; (f) Tuftec H 1052 gels. Gels made from blends (polyblends) of (a)–(f) with other polymers and copolymers include: (8) SEBS-SBS gels; (9) SEBS-SIS gels; (10) SEBS-(SEP) gels; (11) SEBS-(SB)n gels; (12) SEBS-(SEB)n gels; (13) SEBS-(SEP)n gels; (14) SEBS-(SEP)n gels; (15) SEBS-(SI) multiarm gels; (16) SEBS-branched copolymers gels; (17) SEBS-star shaped copolymer gels; gels made from blends of (a)–(f) with other homopolymers include: (18) SEBS/polystrene gels; (19) SEBS/polybutylene gels; (20) SEBS/polyethylene gels; (21) SEBS/polypropoylene gels; (22) inner layer/outer layer gels; triple-layer gels: (23) urethane-silicone-SEBS layered gels. Other suitable thermoplastic elastomers in blends suitable for making gels include SEP/SEBS oil gels (24), SEP/SEPS oil gels (25), SEP/SEPS/SEB oil gels (26), SEPS/SEBS/SEP oil gels (27), SEB/SEBS (28), EB-EP/SEBS (29), SEBS/EB (30), SEBS/EP (31), etc.

The following commercial elastomers can be formed with oil and in combination with other polymers (a)–(c), (d)–(f), and/or (8)–(20) into suitable gels for use in making the bodies of the invention: Shell Kratons D1101, D1102, D1107, D1111, D1112, D1113X, D1114X, D1116, D1117, D1118X, D1122X, D1125X, D1133X, D1135X, D1184, D1188X, D1300X, D1320X, D4122, D4141, D4158, D4240, G1650, G1652, G1657, G1701X, G1702X, G1726X, G1750X, G1765X, FG1901X, FG1921X, D2103, D2109, D2122X, D3202, D3204, D3226, D5298, D5999X, D7340, G1654X, G2701, G2703, G2705, G1706, G2721X, G7155, G7430, G7450, G7523X, G7528X, G7680, G7705, G7702X, G7720, G7722X, G7820, G7821X, G7827, G7890X, G7940; Kuraray's SEP/SEPS or SEP/SEB/SEPS Nos. 1001, 2002, 2003, 3023, 2043, 2063, 2005, 2006, 2050, 2103, 2104, 2105, and 4055.

The most preferred gels forming the airfoils of the invention comprise a high viscosity triblock copolymers which have the more general configuration A-B-A wherein each A is a crystalline polymer end block segment of polystyrene; and B is a elastomeric polymer center block segment of poly(ethylene-butylene). The poly(ethylene-butylene) and polystyrene portions are incompatible and from 2 two-phase system consisting of sub-micron domains of glassy polystyrene interconnected by flexible poly(ethylene-butylene) chains. These domains serve to crosslink and reinforce the structure. This physical elastomeric network structure is reversible, and heating the polymer above the softening point of polystyrene temporarily disrupt the structure, which can be restored by lowering the temperature. Most recent reviews of triblock copolymers are found in the "ENCYCLOPEDIA OF POLYMER SCIENCE AND ENGINEERING", Volume 2 and 5, 1987–1988; "Thermoplastic Elastomers", MODERN PLASTIC ENCYCLOPEDIA, 1989; and Walker, B. M., Ed,. et al., HANDBOOK OF THERMOPLASTIC ELASTOMERS, Van Nostrand Reinhold Co., 2nd Edition, 1988. There publications are incorporated herein by reference).

More specifically, the especially suitable gels for use in the the present invention may be prepared in accordance with the methods disclosed in U.S. Pat. Nos. 4,369,284; 4,618,213; 5,239,723; 5,262,468 and other related applications and patents referred to above which are herein incorporated by reference.

The especially suitable gels can be prepared by melt blending an admixture comprising: (A) 100 parts by weight of a high viscosity triblock copolymer of the general configuration poly(styrene-ethylene-butylene-styrene) (herein referred to as "SEBS") where said triblock copolymer is characterized as having a Brookfield Viscosity of a 20 weight percent solids solution of said triblock copolymer in toluene at 25° C. of about 1,800 cps and higher. (B) from about 200 to about 1,300 parts by weight of an plasticizing oil.

Less typically, the Brookfield Viscosity values of (A) can range from about 1,800 cps to about 30,000 cps or higher. The proportion of hydrocarbon plasticizing oil in (B) is more preferably from about 250 to about 1,200 parts per 100 parts of the triblock copolymer.

The high viscosity triblock copolymer of the invention can have a broad range of styrene end block to ethylene and butylene center block ratio of approximately about 20:80 or less to about 40:60 or higher. Examples of high viscosity triblock copolymers that can be utilized to achieve one or more of the novel properties of the present invention are styrene-ethylene-butylene-styrene block copolymers (SEBS) available from Shell Chemical Company and Pecten Chemical Company (divisions of Shell Oil Company) under trade designations Kraton G 1651, Kraton G 1654X, Kraton G 4600, Kraton G 4609 and the like. Other grades of (SEBS) polymers can also be utilized in the present invention provided such SEBS polymers exhibits the required high viscosity. Such SEBS polymers include (high viscosity) Kraton G 1855X which has a Specific Gravity of 0.92, Brookfield Viscosity of a 25 weight percent solids solution in toluene at 25° C. of about 40,000 cps or about 8,000 to about 20,000 cps at a 20 weight percent solids solution in toluene at 25° C.

The styrene to ethylene and butylene weight ratios for these Shell designated polymers can have a low range of 20:80 or less. Although the typical ratio values for Kraton G 1651, 4600, and 4609 are approximately about 33:67 and for Kraton G 1855X approximately about 27:73, Kraton G 1654X (a lower molecular weight version of Kraton G 1651 with somewhat lower physical properties such as lower solution and melt viscosity) is approximately about 31:69, these ratios can vary broadly from the typical product specification values.

The styrene to ethylene and butylene weight ratio of SEBS useful in forming the bodies 2 can range from lower than about 20:80 to above about 40:60. More specifically, the values can be 19:81, 20:80, 21:79, 22:78, 23:77, 24:76, 25:75, 26:74, 27:73, 28:72, 29:71, 30:70, 31:69, 32:68, 33:67, 34:66, 35:65, 36:64, 37:63, 38:62, 39:61, 40:60, 41:59, 42:58, 43:57, 44:65, 45:55, 46:54, 47:53, 48:52, 49:51, 50:50, 51:49 and etc. Other ratio values of less than 19:81 or higher than 51:49 are also possible. Shell Technical Bulletin SC:1393-92 gives solution viscosity as measured with a Brookfield model RVT viscometer at 25° C. for Kraton G 1654X at 101 weight in toluene of approximately 400 cps and at 15% weight in toluene of approximately 5,600 cps. Broadly, the styrene end block to ethylene and butylene center block ratio of the triblock copolymers of the invention is about 20:80 to about 40:60, less broadly about 31:69 to about 40:60, preferably about 32:68 to about 38:62, more preferably about 32:68 to about 36:64, particularly more preferably about 32:68 to about 34:66, especially more preferably about 33:67 to about 36:64, and most preferably about 33:67. In accordance with the present invention, triblock copolymers such as Kraton G 1654X having ratios of 31:69 or higher can be used and do exhibit some very similar physical properties in many respects to Kraton G 1651 while Kraton G 1654X with ratios below 31:69 may also be use, but they are less preferred due to their decrease in the desirable properties of the final gel. Various triblock copolymers of the gels forming the of the invention can be blended so as to produce a blend of varying ratios of triblock copolymers as desired.

Examples of representative commercially oils include Amoco® polybutenes, hydrogenated polybutenes and polybutenes with epoxide functionality at one end of the polybutene polymer: Example of such polybutenes include: L-14 (320 Mn), L-50 (420 Mn), L-100 (460 Mn), H-15 (560 Mn), H-25 (610 Mn), H-35 (660 Mn), H-50 (750 Mn), H-100 (920 Mn), H-300 (1290 Mn), L-14E (27–37 CST @ 100° F. Viscosity) , H-300E (635–690 cst @ 210° F. Viscosity), Actipol E6 (365 Mn), E16 (973 Mn), E23 (1433 Mn) and the like. Example of various commercially oils include: ARCO Prime (55, 70, 90, 200, 350, 400 and the like), Duraprime and Tufflo oils (6006, 6016, 6016M, 6026, 6036, 6056, 6206, etc) , other white mineral oils include: Bayol, Bernol, American, Blandol, Crakeol, Ervol, Gloria, Kaydol, Litetek, Lyondell (Duraprime 55, 70, 90, 200, 350, 400, etc), Marcol, Parol, Peneteck, Primol, Protol, Sontex, and the like.

Generally, plasticizing oils with average molecular weights less than about 200 and greater than about 700 may also be used (e.g. H-300 (1290 Mn)).

Other polymers and copolymers (in major or minor amounts) can be melt blended with the SEBS as mentioned above without substantially decreasing the desired properties. Such polymers may also be utilized in one or more regions of the airfoils of the invention; these include (SBS) styrene-butadiene-styrene block copolymers, (SIS) styrene-isoprene-styrene block copolymers, (low styrene content SEBS) styrene-ethylene-butylene-styrene block copolymers, (SEP) styrene-ethylene-propylene block copolymers, (SEPS) styrene-ethylene-propylene block copolymers, (SB)n styrene-butadiene and (SEB)n, (SEBS)n, (SEP)n, (SI)n styrene-isoprene multi-arm, branched, and star shaped copolymers and the like. Still, other homopolymers can be utilized in minor amounts; these include: polystyrene, polybutylene, polyethylene, polypropoylene and the like.

Gels having gel rigidities of from less than about 20 gram Bloom to about 800 gram Bloom and higher are especially advantageous and suitable for forming the airfoils of the invention, typically 200 gram Bloom to about 700 gram Bloom.

As used herein, the term "gel rigidity" in gram Bloom is determined by the gram weight required to depress a gel a distance of 4 mm with a piston having a cross-sectional area of 1 square centimeter at 23° C.

Gels less suitable and less advantageous for use in the present invention include polymer gels, crosslinked polymer gels, and the like. These are found in U.S. Pat. No. 4,833, 193; 4,709,982; 4,716,183; 4,497,538; 4,509,821; 4,351, 913; 4,432,607; 5,149,736; PCT Publications WO88/00603; WO9/305113; and WO91/05014.

Other less suitable gels include high strength silicone gels (e.g., Dow Sylgard gel, etc.), urethane gels, water gels (PVA, PEO), and the like. Such gels are inherently weak and do not make good gel airfoils by themselves; they can not withstand the centrifugal force generated during rotation. Such weak gels can be enclosed by the stronger (high strength gels) more advantageous gels described in the invention.

Plasticizers particularly preferred for use in practicing the present invention are will known in the art, they include rubber processing oils such as paraffinic and naphthenic petroleum oils, highly refined aromatic-free paraffinic and naphthenic food and technical grade white petroleum mineral oils, and synthetic liquid oligomers of polybutene, polypropene, polyterpene, etc. The synthetic series process oils are high viscosity oligomers which are permanently fluid liquid nonolefins, isoparaffins or paraffins of moderate to high molecular weight.

The triblock copolymer component by itself lacks the desired properties; whereas, when the triblock copolymer is combined with selected plasticizing oils with an average molecular weight preferably of about 200 to about 800 or more, as determined by ebulliscopic methods, wherein, for most purposes, the oil constitutes about 300 to about 1,600 parts and more preferably about 350 to about 1,600 parts by weight of the triblock copolymer, that an extremely soft and highly elastic material is obtained. This transformation of the triblock copolymer structure in heated oil resulting in a composition having a gel rigidity preferably of about 20 gram to about 800 gram Bloom or more and substantially without oil bleedout along with high tensile strength and elongation and other desirable combination of physical properties is unexpected.

The gel utilized for the gel airfoils can also contain useful amounts of conventionally employed additives such as stabilizers, antioxidants, antiblocking agents, colorants, fragrances, flame retardants, other polymers in minor amounts and the like to an extend not affecting or substantially decreasing the desired properties of the present invention.

Additives useful in the gel of the present invention include: tetrakis[methylene 3,-(3'5'-di-tertbutyl-4"-hydroxyphenyl) propionate] methane, octadecyl 3-(3",55"-di-tert-butyl-4"-hydroxyphenyl) propionate, distearyl-pentaerythritol-diproprionate, thiodiethylene bis-(3,5-ter-butyl-4-hydroxy) hydrocinnamate, (1,3,5-trimethyl-2,4,6-tris[3,5-di-tert-butyl-4-hydroxybenzyl] benzene), 4,4"-methylenebis(2,6-di-tert-butylphenol), stearic acid, oleic acid, stearamide, behenamide, oleamide, erucamide, N,N"-ethylenebisstearamide, N,N"-ethylenebisoleamide, sterryl erucamide, erucyl erucamide, oleyl palmitamide, stearyl stearamide, erucyl stearamide, calcium sterate, other metal sterates, waxes (e.g. polyethylene, polypropylene, microcrystalline, carnauba, paraffin, montan, candelilla, beeswax, ozokerite, ceresine, and the like). The gel can also contain metallic pigments (aluminum and brass flakes), $TiO_2$, mica, fluorescent dyes and pigments, phosphorescent pigments, aluminatrihydrate, antimony oxide, iron oxides ($Fe_3O_4$, —$Fe_2O_3$, etc.), iron cobalt oxides, chromium dioxide, iron, barium ferrite, strontium ferrite and other magnetic particle materials, molybdenum, silicone fluids, lake pigments, aluminates, ceramic pigments, ironblues, ultramarines, phthalocynines, azo pigments, carbon blacks, silicon dioxide, silica, clay, feldspar, glass microspheres, barium ferrite, wollastonite and the like. The report of the committee on Magnetic Materials, Publication NMAB-426, National Academy Press (1985) is incorporated herein by reference.

The compositions of the present invention are prepared by blending together the components including other additives as desired at about 23° C. to about 100° C. forming a paste like mixture and further heating said mixture uniformly to about 150° C. to about 200° C. until a homogeneous molten blend is obtained. Lower and higher temperatures can also be utilized depending on the viscosity of the oils and amount of SEBS used. These components blend easily in the melt and a heated vessel equipped with a stirrer is all that is required. As an example, small batches can be easily blended in a test tube using a glass stirring rod for mixing. While conventional large vessels with pressure and/or vacuum means can be utilized in forming large batches of the instant compositions in amounts of about 40 lbs or less to 10,000 lbs or more. For example, in a large vessel, inert gases can be employed for removing the composition from a closed vessel at the end of mixing and a partial vacuum can be applied to remove any entrapped bubbles. Stirring rates utilized for large batches can range from about less than about 10 rpm to about 40 rpm or higher.

The composition of the airfoils of the invention is excellent for cast molding and the molded products have various excellent characteristics which cannot be anticipated form the properties of the raw components.

The basis of this invention resides in the fact that a high viscosity poly(styrene-ethylene-butylene-styrene) triblock copolymer when blended in the melt with an appropriate amount of plasticizing oil makes possible the attainment of compositions having a desirable combination of physical and mechanical properties, notably high elongation at break of at least 1,600%, ultimate tensile strength of about at least $8 \times 10^5$ dyne/$cm^2$, low elongation set at break of substantially not greater than about 2%, tear resistance of at least $5 \times 10^5$ dyne/$cm^2$, substantially about 100% snap back when extended to 1,200% elongation, and a gel rigidity of substantially not greater than about 800 gram Bloom.

More specifically, the composition utilized in the present invention exhibit one or more of the following properties. These are: (1) tensile strength of about $8 \times 10^5$ dyne/cm$^2$ to about $10^7$ dyne/cm$^2$; (2) elongation of about 1,600% to about 3,000% and higher; (3) elasticity modulus of about $10^4$ dyne/cm$^2$ to about $10^6$ dyne/cm$^2$; (4) shear modulus of about $10^4$ dyne/cm$^2$ to about $10^6$ dyne/cm$^2$ as measured with a 1, 2, and 3 kilogram load at 23° C.; (5) gel rigidity of about 20 gram Bloom or lower to about 700 gram Bloom as measured by the gram weight required to depress a gel a distance of 4 mm with a piston having a cross-sectional area of 1 square cm at 23° C.; (6) tear propagation resistance of at least about $5 \times 10^5$ dyne/cm$^2$; (7) and substantially 100% snap back recovery when extended at a crosshead separation speed of 25 cm/minute to 1,200% at 23° C. Properties (1), (2), (3), and (6) above are measured at a crosshead separation speed of 25 cm/minute at 23° C. It should be noted that when the ratio falls below 31:69, various properties such as elongation, tensile strength, tear resistance and the like can decrease while retaining other desired properties, such as gel rigidity, flexibility, elastic memory.

The instant airfoils molded from the compositions have various additional important advantages in that they do not crack, creep, tear, crack, or rupture flextural, tension, compression, or other deforming conditions or normal use; but rather the molded airfoils made from the instant composition possess the intrinsic properties of elastic memory enabling the airfoils to recover and retain its original molded shape after many extreme deformation cycles. In applications where low rigidity, high elongation, good compression set and excellent tensile strength are important, the instant compositions would be preferred.

The composition of the invention is extremely versatile; it can be casted, molded, or extruded to make the airfoils of the invention.

The invention is further illustrated by means of the following illustrative embodiments, which are given for purpose of illustration only and are not meant to limit the invention to the particular components and amounts disclosed.

EXAMPLE I

One hundred parts by weight of a high viscosity poly (styrene-ethylene-block butylene- styrene) triblock copolymer (Shell Kraton G 1651) with 0.1 parts by weight of a stabilizer (Irrganox 1010) was melt blended with various quantities of a naphthenic oil (ARCO Tufflo 6024). Samples having the dimensions of 5 cm×3 cm were cut and measured for gel rigidity on a modified Bloom gelometer as determined by the gram weight required to depress the gel a distance of 4 mm with a piston having a cross-sectional area of 1 cm$^2$. The average gel rigidity values with respect to various oil concentrations are set forth in Table I below.

TABLE I

| Oil per 100 parts of Triblock copolymer | Gel Rigidity, gram Bloom |
|---|---|
| 360 | 500 |
| 463 | 348 |
| 520 | 280 |
| 615 | 240 |
| 635 | 220 |
| 710 | 172 |

TABLE I-continued

| Oil per 100 parts of Triblock copolymer | Gel Rigidity, gram Bloom |
|---|---|
| 838 | 135 |
| 1,587 | 54 |

TABLE II

| Experiment | 400 elongation Rotation Speed rpm | Gel Rigidity, gram Bloom |
|---|---|---|
| 1 | 732 | 51 |
| 2 | 805 | 75 |
| 3 | 929 | 105 |
| 4 | 941 | 109 |
| 5 | 835 | 82.5 |
| 6 | 989 | 113 |
| 7 | 1095 | 140 |

EXAMPLE III

Airfoil designs which require support and/or stability on its upper or lower surfaces can be made by interlocking the gel with a foam. Such a foam is SCOTFOAM® 1/32' to 1/8' thick sheet material with 5, 10, 15, 20, 25, 30, 45, 50, 60, 70, 80, 90, 100, and 200 ppi.

EXAMPLE IV

Figure 2:
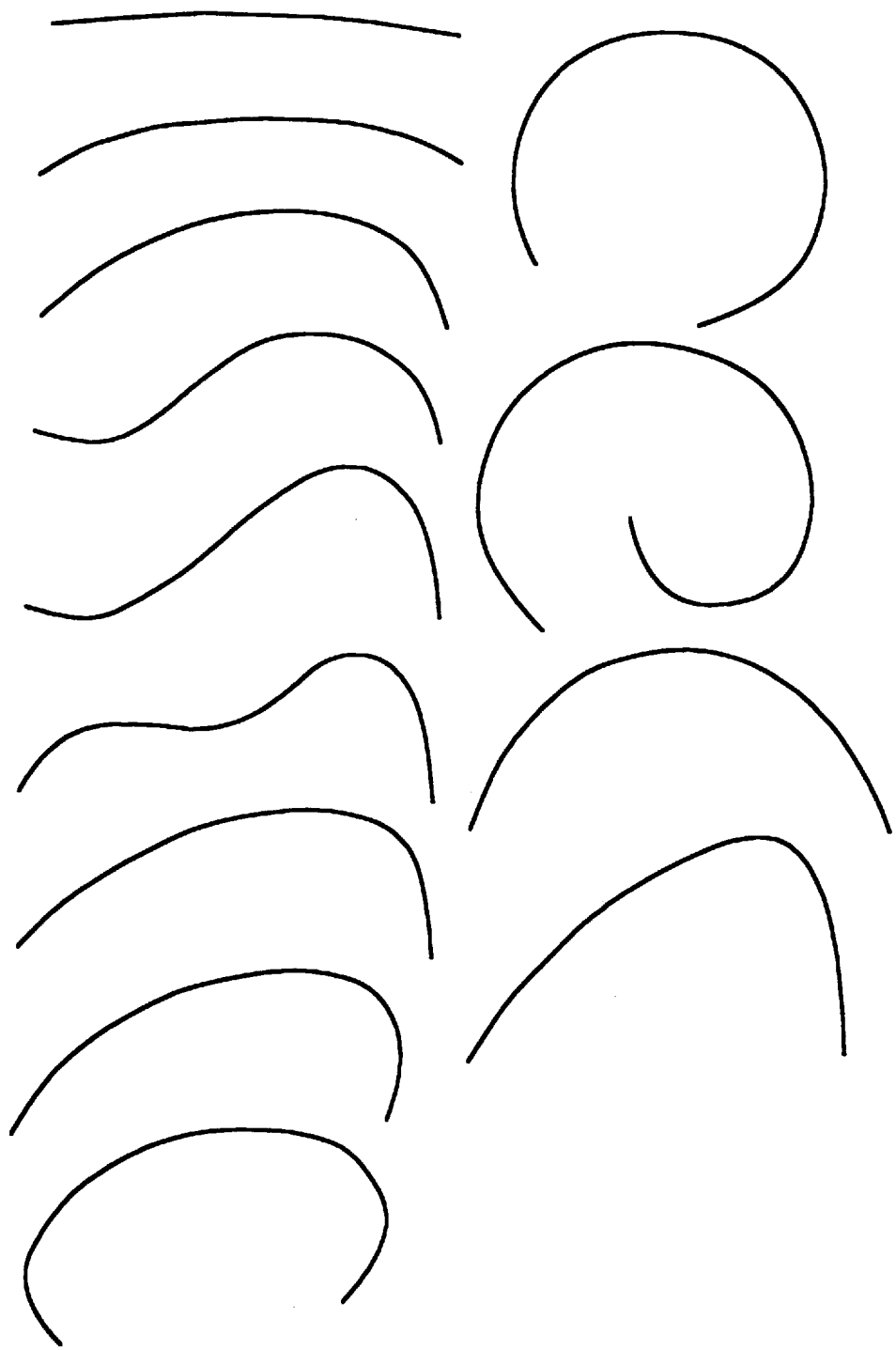
FIG. 2. Line view of selected examples of mean camber lines of airfoils of the invention.
Figure 3:
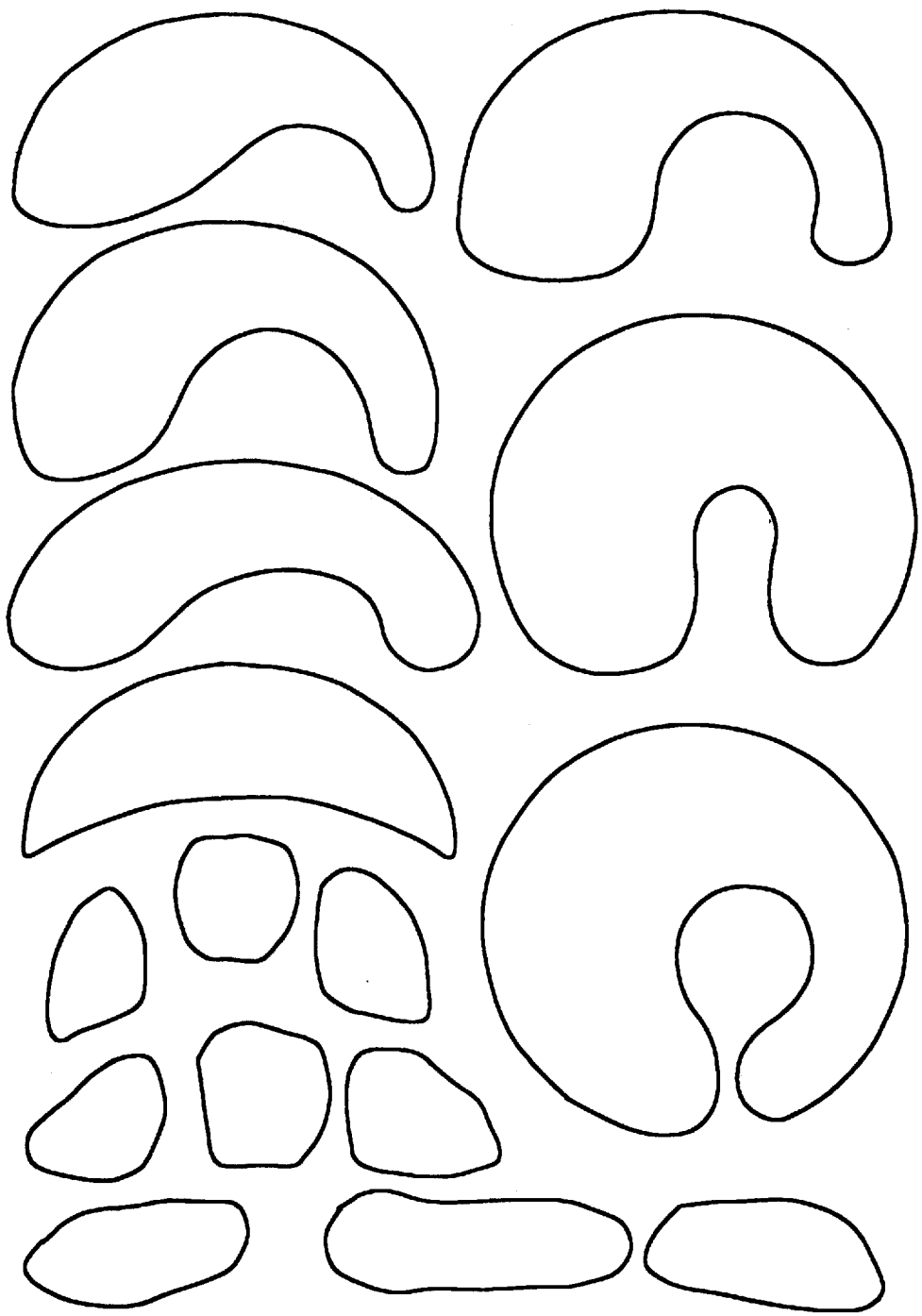
FIG. 3. Side view of various representative profile cross section imprint tracings of airfoils of the invention including an imprint of one of the airfoils at an elongation greater than 200%.
Figure 4:
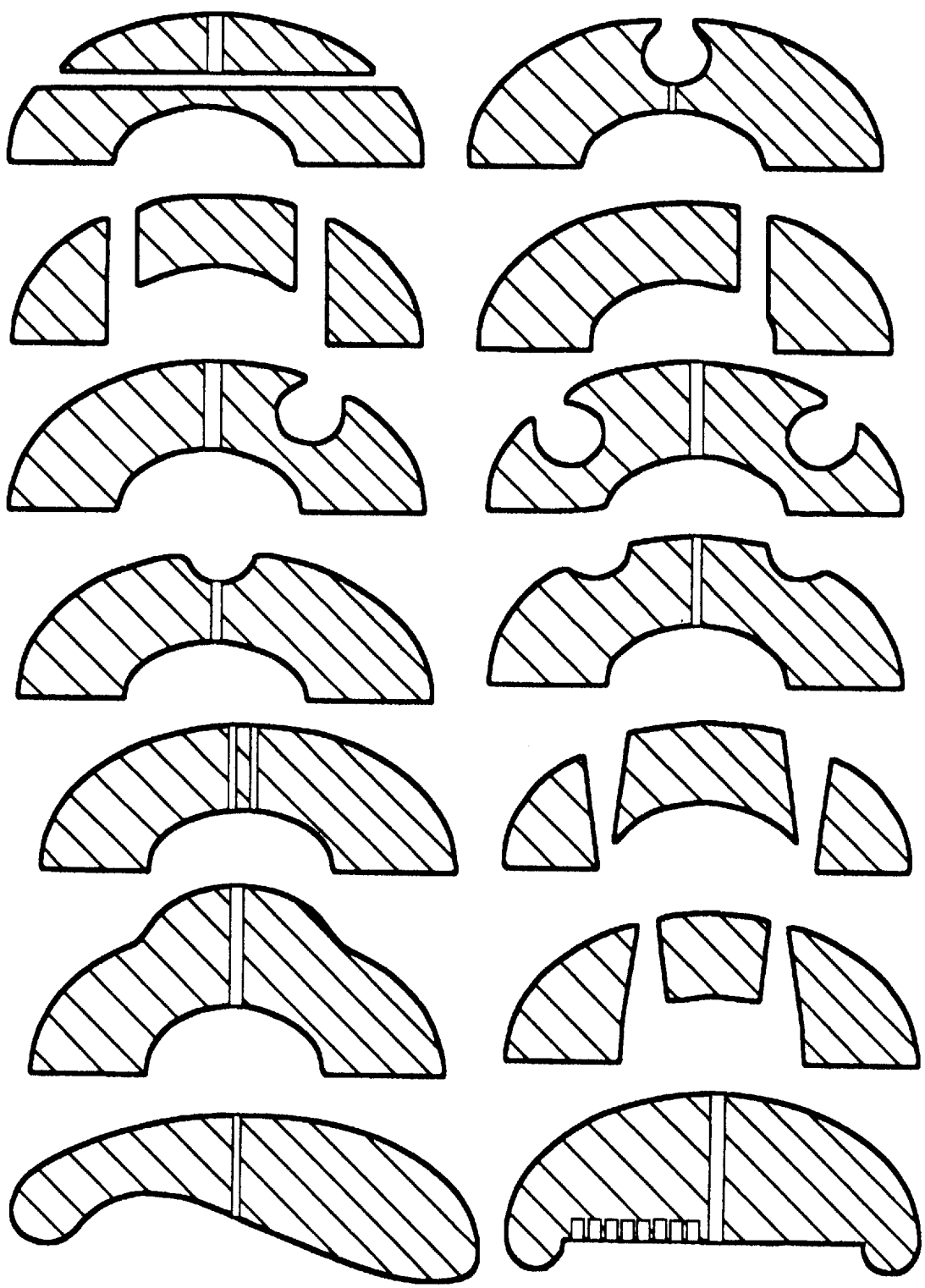
FIG. 4. Representative sectional views of shaped airfoils with holes, cavities, and slots.
Figure 5:
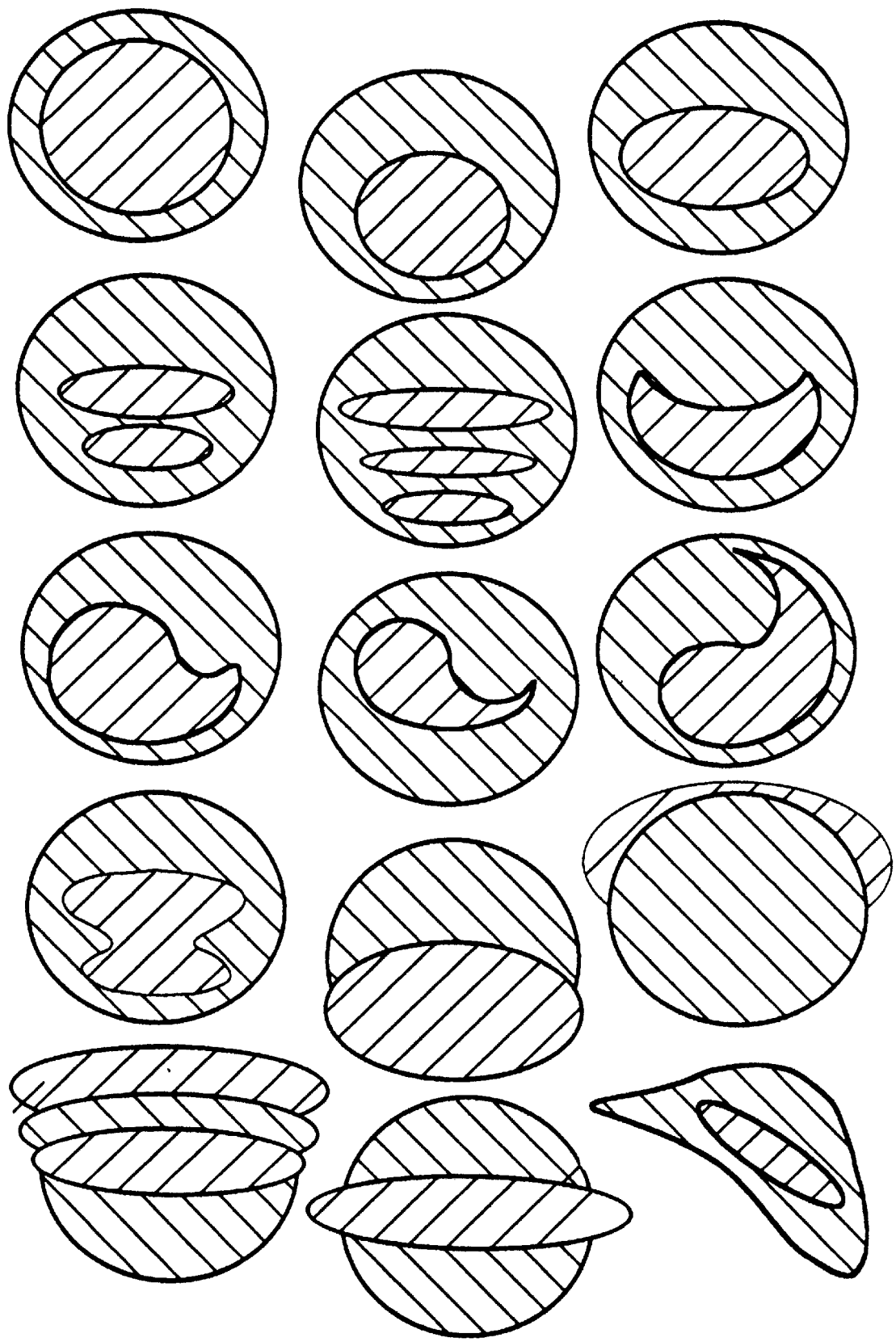
FIG. 5. Representative sectional views of various shaped airfoils with more than one gel regions.
Figure 6:
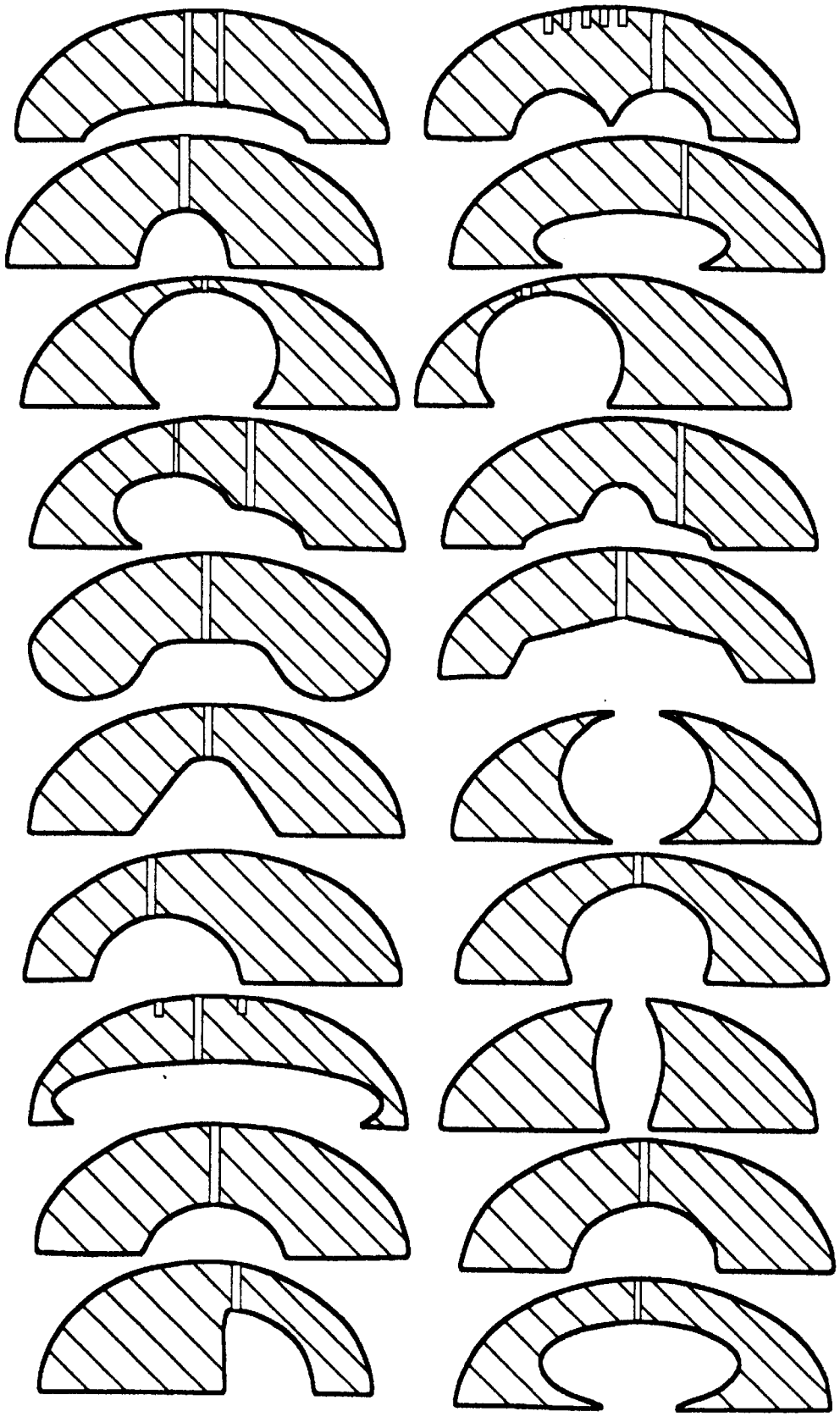
FIG. 6. More representative sectional views of shaped airfoils with holes, cavities, and slots.
Figure 7:
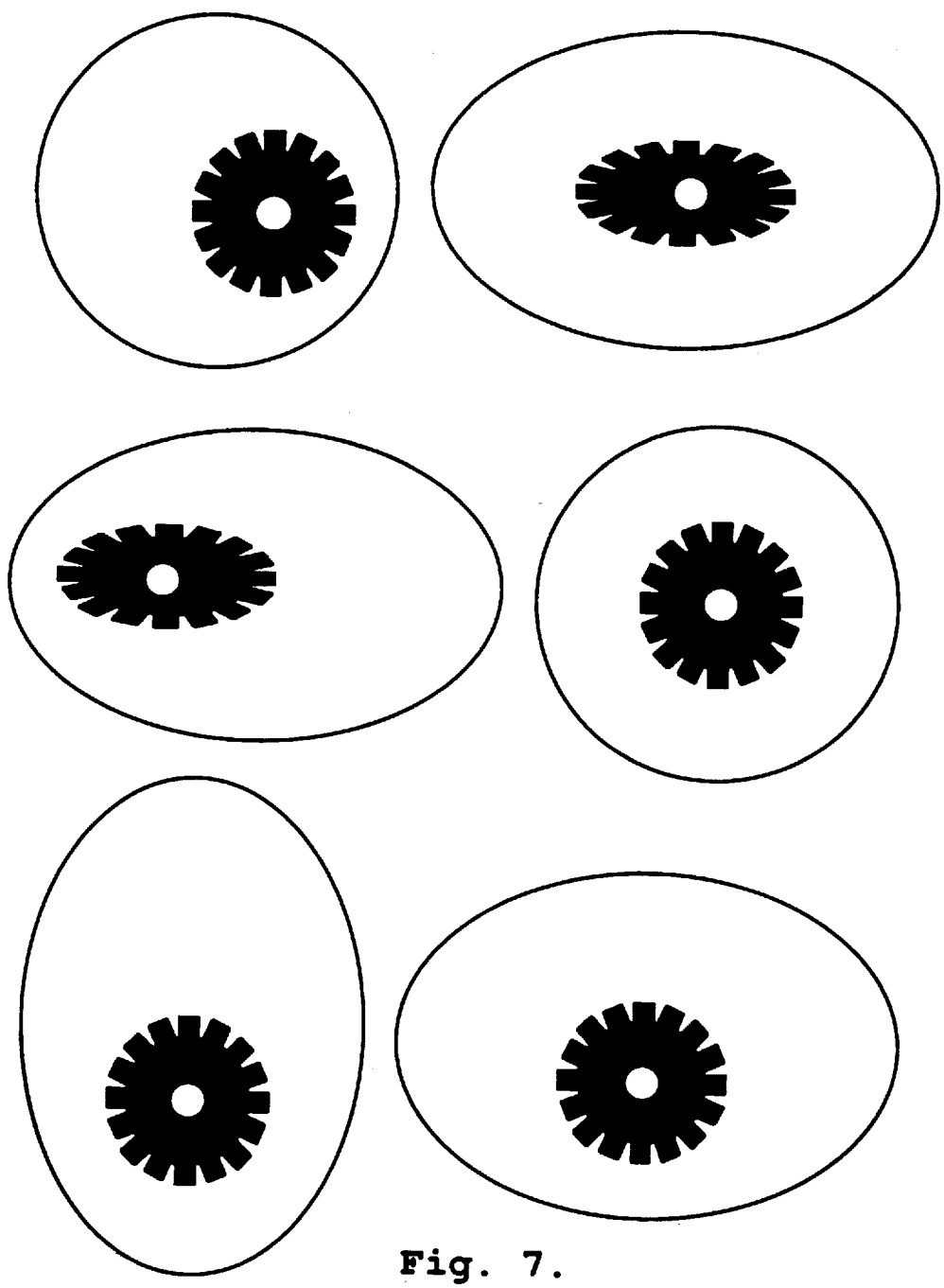
FIG. 7. Bottom view of airfoils showing a hole centered through a cavity (shown in black).

Selected airfoils having profiles with mean camber of FIG. 2, and selected airfoils profiles of FIG. 3, 4, 5, and 6 were formed from gels of Table I and tested at various wind speeds.

EXAMPLE V

Figure 8:
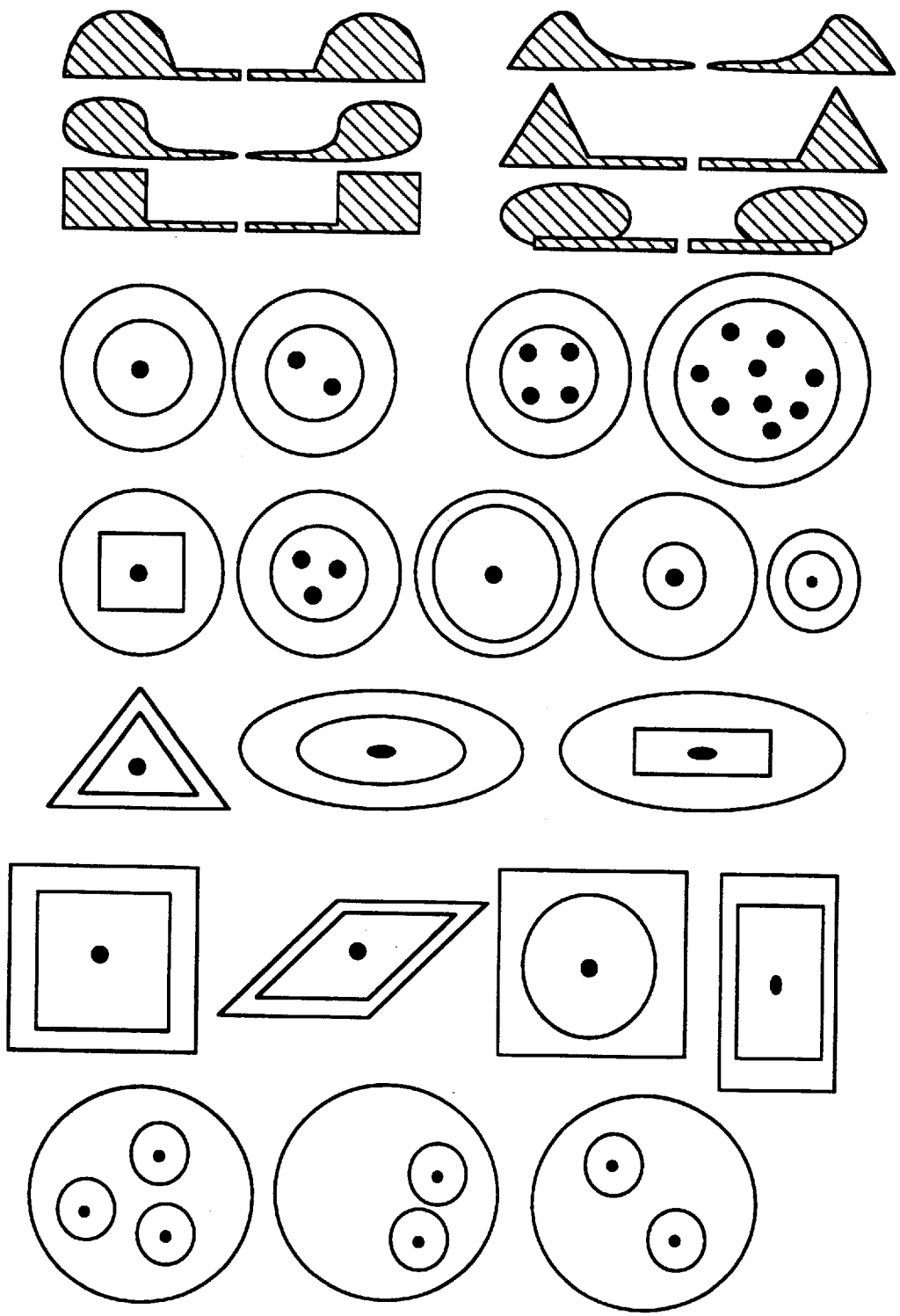
FIG. 8. Cross sectional view of membrane airfoils with hole and top view of membrane airfoils with one or more holes.
Figure 9:
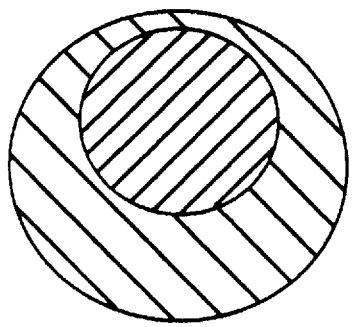
FIG. 9a. Representative cross sectional view of spherical shaped airfoil with two gel regions.
FIG. 9b. Cross sectional view of FIG. 9a airfoil resting on a support.
Figure 9:
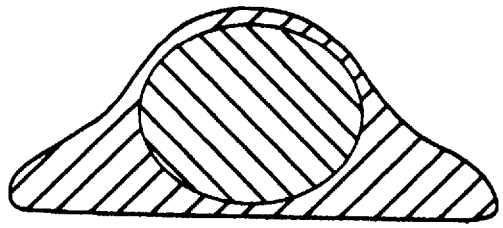
Figure 10:
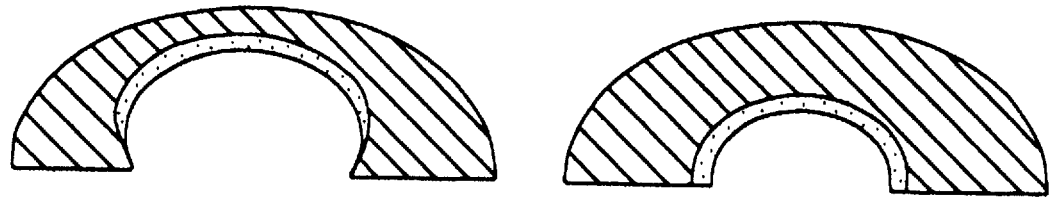
FIG. 10. Cross sectional views of airfoils with foam layers.
Figure 10:
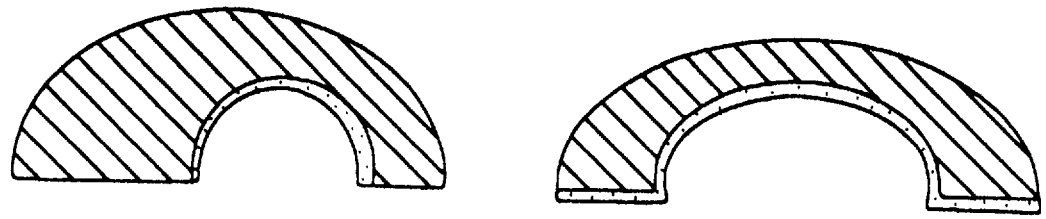

Selected airfoils having membrane profiles of FIG. 8 were formed from gels of Table I and tested at various wind speeds. For best results, the hole diameter in the membrane is about 0.2 cm to about 2.5 cm.

EXAMPLE VI

Selected airfoils with cavities, holes, and slots of FIGS. 2, 3, 4, 6, 7, and 10 were formed from gels of Table I and tested at various wind speeds. For best results, the hole diameter is about 0.2 cm to about 1 cm; the cavity diameter is about 1 cm to about 3 cm; and the slot size is about 0.1 cm to about 0.5 cm.

While preferred components and formulation ranges have been disclosed herein. Persons of skill in the art can e-tend these ranges using appropriate material according to the principles discussed herein. All such variations and deviations which rely on the teachings through which the present invention has advanced the art are considered to be within the spirit and scope of the present invention.

What I claim is:

1. An aerodynamic toy comprising: an ultra-elastic gel airfoil having a profile defining a camber, said gel airfoil having at least one cavity and said cavity having a surface of one or more expandable slots capable of reducing stress and tearing of said airfoil at launch and one or more holes so as to provide greater flight stability and prevent said airfoil from turn over; said airfoil capable of exhibiting an elongation of at least 50% caused by a centrifugal force of rotation.

2. An aerodynamic toy comprising: an ultra-elastic gel airfoil having an upper surface, a lower surface, and a profile defining a camber, said lower surface of said gel airfoil having at least one cavity, said cavity having a surface of one or more expandable slots so as to allow for a greater surface expansion of said airfoil surface area, attainment of a greater airfoil level flight distance and reducing stress and tearing of said airfoil at launch; said airfoil capable of exhibiting an elongation of at least 50% caused by a centrifugal force of rotation.

3. An aerodynamic toy comprising: an ultra-elastic gel airfoil having an upper surface, a lower surface, and a profile defining a camber, said lower surface of said gel airfoil having at least one cavity, said cavity having a surface of one or more expandable slots so as to allow for a greater surface expansion of said airfoil surface area, attainment of a greater airfoil level flight distance and reducing stress and tearing of said airfoil at launch; said upper surface having one or more slots, and said airfoil capable of exhibiting an elongation of at least 50% caused by a centrifugal force of rotation.

4. An aerodynamic toy comprising: an ultra-elastic gel airfoil having an upper surface, a lower surface, and a profile defining a camber, said gel airfoil having at least one cavity, said cavity having a surface of one or more expandable slots capable of reducing stress and tearing of said airfoil at launch and one or more holes so as to provide greater flight stability and prevent said airfoil from turn over; said upper surface having one or more slots: and said airfoil capable of exhibiting an elongation of at least 50% caused by a centrifugal force of rotation.

5. An aerodynamic toy comprising: an ultra-elastic gel airfoil having a profile defining a camber, said airfoil connected by a connective membrane for controlling the stretching of said airfoil caused by at least 50% elongation of said airfoil due to a centrifugal force of rotation.

6. An aerodynamic toy of claim 5, wherein said connective membrane connecting said airfoil having at least one hole so as to provide for control of stretching said airfoil caused by said centrifugal force during flight.

7. An aerodynamic toy comprising: an ultra-elastic gel airfoil having a profile defining a camber, said gel airfoil having at least one of a upper surface and a lower surface and said lower surface having at least one cavity, said cavity having a surface of one or more expandable slots so as to allow for a greater surface expansion of said airfoil lower surface area, attainment of a greater airfoil level flight distance and reducing stress and tearing of said airfoil at launch and one or more slots so as to reduce drag, provide greater lift and prevent early onset of stall; said airfoil capable of exhibiting an elongation of at least 50% caused by a centrifugal force of rotation.

8. An aerodynamic toy comprising: an ultra-elastic gel airfoil having a profile defining a camber, said gel airfoil having a connective membrane connecting said airfoil, said connective membrane having one or more hole: said connective membrane in combination with said hole being capable of controlling said airfoil stretching at least 50% caused by a centrifugal force of rotation during flight.

9. An aerodynamic toy comprising: an ultra-elastic gel airfoil having a profile defining a camber, said gel airfoil having a upper surface and a lower surface: said upper surface having one or more slots so as to reduce drag, provide greater lift and prevent early onset of stall; said airfoil having a connective membrane connecting said airfoil, said connective membrane having one or more hole: said connective membrane in combination with said hole being capable of controlling said airfoil stretching at least 50% caused by a centrifugal force of rotation during flight.

10. An aerodynamic toy of claim 8 or 9, wherein said lower surface of said gel airfoil having at least one cavity, said cavity having a surface of one or more expandable slots capable of reducing stress and tearing of said airfoil at launch.

11. An aerodynamic toy comprising: an ultra-elastic gel airfoil having a profile defining a camber, said gel airfoil having an lower surface and a connective membrane, said membrane having one or more holes; said membrane in combination with said hole being capable of controlling said airfoil stretching at least 50% caused by a centrifugal force of rotation during flight so as to provide greater flight stability and prevent said airfoil from turn over.

12. An aerodynamic toy comprising: an ultra-elastic gel airfoil having a profile defining a camber, said gel airfoil having an upper surface, a lower surface, and a connective membrane, said connective membrane having one or more holes; said lower surface having one or more cavities so as to allow for a greater surface expansion of said airfoil surface area, attainment of a greater airfoil level flight distance and reducing stress and tearing of said airfoil at launch, and said upper surface having one or more slots so as to provide for greater lift and prevent early onset of stall; said membrane in combination with said hole being capable of controlling said airfoil stretching at least 50% elongation of said airfoil by a centrifugal force of rotation during flight.

13. An aerodynamic toy comprising: an ultra-elastic gel airfoil having a profile defining a camber, said gel airfoil connected by a connective membrane, said connective membrane having two or more holes; said connective membrane in combination with said hole being capable of controlling said airfoil stretching at least 50% caused by a centrifugal force of rotation during flight.

14. A method comprising launching an aerodynamic toy in the shape of an airfoil having a upper surface, a lower surface, said airfoil connected by a connective membrane having one or more holes; said lower having one or more cavities, and said upper surface having one or more slots; said upper and lower surfaces converging to form an edge, which comprises:

(a) gripping the edge of an airfoil made from an ultra-soft and ultra-elastic gel between the forefinger and the thumb of one hand, and (b) launching the airfoil with sufficient rotational velocity so as to elongate said gel airfoil at least 50% or greater due to the centrifugal force of rotation.

15. A method comprising launching an aerodynamic toy in the shape of an airfoil having a upper surface and a lower surface, said airfoil connected by a connective membrane having one or more holes: said lower having cue or more cavities and said upper surface having one or more slots; said upper and lower surfaces converging to form an edge, which comprises:

(a) gripping the edge of an airfoil made from an ultra-soft and ultra-elastic gel between the forefinger and the thumb of one hand, and (b) launching the airfoil with sufficient horizontal and rotational velocity of about 5 to about 80 miles per hour horizontal and about 10 to about 1,500 revolutions per minute rotational so as to elongate said gel airfoil at least about 50% due to the centrifugal force of rotation.

* * * * *